United States Patent [19]

Morton

[11] Patent Number: 4,787,583

[45] Date of Patent: Nov. 29, 1988

[54] CLAMP FOR ARCTIC PIPELINE SUPPORT

[75] Inventor: Arthur W. Morton, Houston, Tex.

[73] Assignee: Conoco Inc., Ponca City, Okla.

[21] Appl. No.: 433,935

[22] Filed: Oct. 12, 1982

[51] Int. Cl.⁴ ............................................. F16L 3/16
[52] U.S. Cl. ................................................. 248/55
[58] Field of Search .................. 248/49, 55, 62, 63; 285/61

[56] References Cited

U.S. PATENT DOCUMENTS

| | | | |
|---|---|---|---|
| 3,026,076 | 3/1962 | Bender | 248/49 |
| 3,466,220 | 9/1969 | Allinikov et al. | 161/68 |
| 3,563,503 | 2/1971 | Lancaster | 248/49 |
| 3,616,140 | 10/1971 | Copeland et al. | 161/68 |
| 3,642,308 | 2/1972 | Zeile | 248/49 |
| 3,740,301 | 6/1973 | Manning et al. | 161/58 |
| 3,980,262 | 9/1976 | Lee | 248/49 |
| 4,017,046 | 4/1977 | Hicks | 248/55 |
| 4,077,652 | 3/1978 | McCaskey, Jr. et al. | 280/610 |
| 4,083,656 | 4/1978 | Braswell et al. | 416/226 |
| 4,128,219 | 12/1978 | Kaigler | 248/55 |
| 4,136,846 | 1/1979 | Brault | 244/123 |
| 4,139,142 | 2/1979 | Maple | 248/55 |
| 4,207,366 | 6/1980 | Tyler | 428/73 |
| 4,249,976 | 2/1981 | Hudson | 156/286 |
| 4,272,578 | 6/1981 | Schegerin | 428/113 |
| 4,315,557 | 2/1982 | Nakaya et al. | 181/168 |
| 4,403,759 | 9/1983 | Hicks | 248/55 |

*Primary Examiner*—Alvin C. Chin-Shue
*Attorney, Agent, or Firm*—Richard K. Thomson

[57] ABSTRACT

A pipeline clamp for securing a heated arctic pipeline to its support structure comprises a sandwich material of inner and outer layers of fiber reinforced rigid polymer and an intermediate core layer of honeycomb-form aramid paper. The clamp affords all the engineering advantages of prior steel clamps without the disadvantages of being heat conductive which can result in conductance of pipeline heat to the permafrost layer as well as "freezing out" of low melting paraffins flowing within the pipeline which decrease pipeline efficiencies.

5 Claims, 1 Drawing Sheet

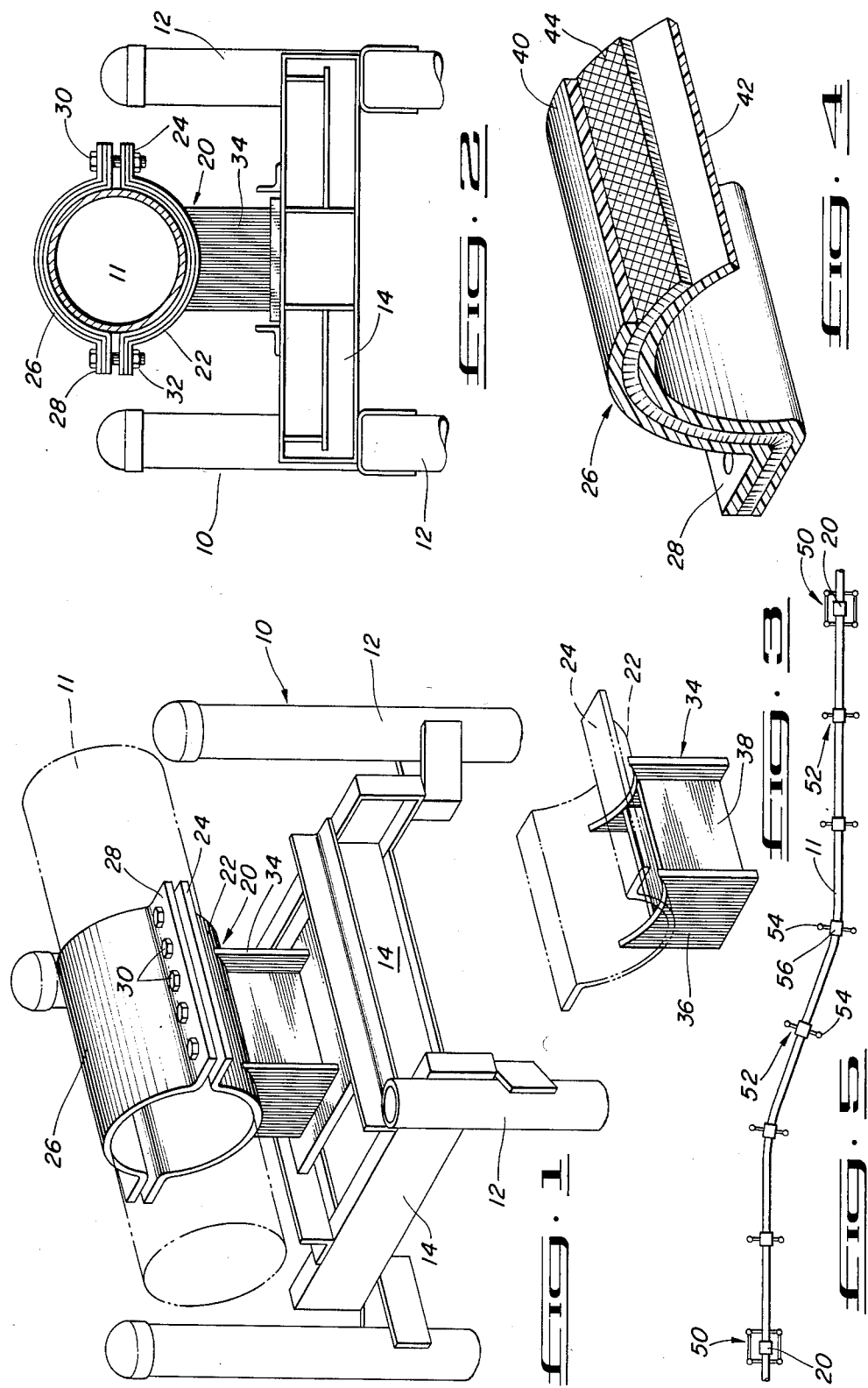

CLAMP FOR ARCTIC PIPELINE SUPPORT

This invention relates to the art of arctic pipeline construction and, more particularly, to an improved clamp for supporting a heated arctic pipeline without damage to the permafrost or loss of heat which affects fluid flow.

BACKGROUND OF THE INVENTION

The arctic environment such as in the Alaskan North Slope oil production area has presented many challenges to pipeline engineers. One of the most difficult challenges has been the protection and preservation of the permafrost surface of the ground over which a pipeline must travel. Fluid temperatures of upwards of 190° F. flowing within the pipeline presents significant difficulty in designing and constructing pipeline supports which will not damage the permafrost or result in pipeline damage if such permafrost melting should occur.

The most common means for supporting an arctic pipeline has been to elevate the pipeline above the permafrost layer. The pipeline is supported in this manner by a number of spaced support members of varying design. In each of these support members, a clamp encircles the pipeline, the clamp being connected to the ground by a structure which will support the weight of the pipeline. At spaced points along the pipeline, the pipeline is tightly clamped and held firmly by an anchoring structure. Intermediate to these anchoring points, supporting saddle clamps and supports of less rigorous construction allow for sliding of the pipeline due to expansion and contraction resulting from differential heating. In all of such support structures, whether anchoring points or intermediate supports, heat transference from the pipeline to the support structure and ultimately the permafrost layer presents a problem.

The high ice (water) content of the permafrost layer can be easily melted by a structure which conducts heat away from the pipeline. Such melting results in sinking and/or heaving of the support structure which can rupture the pipeline with its consequent damage to the environment.

A further problem with such support structures resulting from the fact that the clamps and structures conduct heat from the pipeline are that they act as a heat sink. These so-called "cold spots" present a significant problem to the transportation of crude oil. Cooling can increase the viscosity of the flowing fluids thereby decreasing pipeline efficiency. Further, low melting paraffins can "freeze out" at these cold spots causing a restriction in the pipeline and thus, decreased flow. To date, the only effective means for overcoming the problems of cold spots is to heat the fluid to an even higher temperature with the resultant increased energy costs and an increased possibility of permafrost melting.

SUMMARY OF THE INVENTION

The present invention provides a clamp which meets all of the engineering requirements for pipeline anchoring and supporting while avoiding the heat sink problem and permafrost damage which can be associated with steel clamps used in the prior art.

In accordance with the invention, a ring clamp for supporting and anchoring an artic pipeline comprises substantially rigid, curved clamp portions adapted to encircle an arctic pipeline and fastening means for connecting the clamp portions. The clamp portions are made from a layered, sandwich composite, the inner and outer layers being of fiber reinforced rigid polymer and an intermediate core layer of honeycomb-form aramid paper.

Further in accordance with the invention, the above described composite clamp is connected to a pipeline support structure utilizing mounting means formed from a similar composite structure of fiber-reinforced rigid polymer having a core layer of honeycomb-form aramid paper.

It is therefore an object of this invention to replace the prior art steel arctic pipeline anchoring clamp with a clamp that affords all of the engineering properties of a steel clamp but avoids the heat transference problems which can result in both damage to the permafrost and decreased pipeline efficiencies.

BRIEF DESCRIPTION OF THE DRAWINGS

These and other objects are accomplished through the manner and form of the present invention as will be described hereinafter in conjunction with the accompanying drawings forming a part of the specification and in which:

FIG. 1 is a perspective view of an arctic pipeline anchor employing the clamp of the present invention;

FIG. 2 is another view in partial cross-section of the pipeline and anchoring system shown in FIG. 1;

FIG. 3 is a perspective view, with portions shown in phantom, of a portion of the clamp structure of a preferred embodiment of this invention;

FIG. 4 is a fragmentary view of a portion of the preferred composite structure of one of the clamping elements of this invention, and FIG. 5 is a plan view of a pipeline system showing anchoring points and intermediate supports allowing for pipeline expansion and in which the pipeline clamp in accordance with this invention may be employed.

DETAILED DESCRIPTION OF THE PREFERRED EMBODIMENTS AND THE DRAWINGS

Referring now to the drawings wherein the showings are for the purposes of illustrating a preferred embodiment of the invention only and not for the purpose of limiting same, FIGS. 1 and 2 show a pipeline anchoring structure 10 constructed so as to support a pipeline 11 in an elevated position above the ground surface. The pipeline anchoring structure 10 comprises a plurality of stanchion members 12 which are interconnected by a plurality of bracing members 14. The stanchion and bracing members 12, 14 work in conjunction with and provide support for a clamp member generally designated as 20 for securing the position of the pipeline 11. As shown in the figures, the clamp member 20 comprises a ring structure adapted to completely encircle the pipeline 11. The clamp member comprises a lower saddle portion 22 having diametrically opposed, radially outwardly extending flange portions 24. Similarly, the clamp is provided with an upper retaining portion 26 which completes the encirclement of the pipeline 11 and includes diametrically opposed, radially outwardly extending flange portions 28 which correspond to flange portions 24 of the lower saddle portion 22. The overlapping flange portions 28, 24 are secured to each other to effect the clamping of the pipeline 12 by a plurality of fastening means such as a plurality of threaded bolts 30 and threaded nuts 32.

A support cradle 34 extends from and is bonded to the lower saddle portion 22 of the clamp 20. The support cradle 34 acts to interconnect the clamp structure 20 with the pipeline anchoring structure 10 and to isolate the clamp holding the heated pipeline from the anchoring structure 10.

The support cradle 34 conforms to the outer surface of the lower saddle portion 22 and is constructed so as to fully support the weight of the clamp and pipeline held therein. In its preferred form, the support cradle 34 has a generally box beam structure (FIG. 3) including flanged end walls 36 and at least a pair of intermediate web walls 38 extending between the flanged end walls 36. The support cradle 34 is attached to the bracing members 14 by any common appropriate means such as clamping members or bolts.

In accordance with the invention, the clamping member 20 including the upper retaining portion 26, lower saddle portion 22 and, preferably, the support cradle 34, are made of a composite, non-metallic structure. In its preferred form (FIG. 4), the composite, non-metallic structure comprises a three-layer sandwich having inner and outer layers 40, 42 made of fiber-reinforced polymer (FRP) with an intermediate core layer 44 comprising a honeycomb-form aramid paper such as that sold by E. I. du Pont de Nemours and Company under the trademark NOMEX ®. The FRP inner and outer layers 40, 42 are preferably made from a rigid, thermoplastic material with fiber reinforcing such as glass fiber. It will be understood that while glass fiber is the preferred reinforcing fiber material in the FRP layers, other fibers such as textile, carbon or aramid fibers may be used.

The honeycomb aramid paper core material 44 is known for its high strength, low weight properties in polymer composites. It has been used for the structural material in light weight, high performance snow skis as well as reinforcing core material for aluminum sandwich, light-weight wall structures.

In combination with fiber reinforced polymer inner and outer layers, the core 44 of honeycomb-form aramid paper provides a structure having the strength of steel with much less weight and very low heat conducting properties. When fabricated into a clamp 20 for the anchoring and support of an arctic pipeline, the composite structure of this invention affords all the engineering advantages of steel pipeline clamps but avoids the cold spot and heat sink qualities of prior art steel clamps since the composite clamps of this invention are insulating rather than heat conducting. Thus, there is no decrease in pipeline efficiencies due to "freezing out" of low melting paraffins in the area of a clamp 20 nor is there heat conductance from the hot pipeline 12 through the clamp 20 and the anchoring structure 10 which will heat the supporting ground thus melting the permafrost.

As shown in FIG. 5, a pipeline support system comprises spaced anchoring points 50 constructed in a manner such as that shown in FIGS. 1 and 2 wherein a pipeline 11 is anchored and held in a fixed position through a clamp 20 and a pipeline anchoring structure 10. Intermediate pipeline anchor points 50, the pipeline 11 is supported by a plurality of intermediate expansion supports 52. These intermediate expansion supports act to merely support the pipeline in an elevated position but do not clamp the pipeline in a fixed position such as at the anchoring points 50. Thus, the intermediate support clamps 52 comprise stanchion members 54 which are fixed to a clamp 56 which loosely encircles the pipeline 11 so that the pipeline 11 may move longitudinally through the encircling clamp 56. Since the clamp 56 can also act to conduct heat away from the pipeline with its resultant disadvantages as aforesaid, the clamps 56 are constructed from a composite of inner and outer layers of FRP and a central core layer of honeycomb-form aramid paper as with the clamps 20 used at anchor points 50. However, since the pipeline must be capable of sliding through the clamp in order to adjust to expansion and contration due to heating and cooling, it is preferred to line the inner surface of the inner FRP layer which is in contact with the pipeline 11 with a layer of a low friction material such as a polytetrafluoroethylene film.

From the foregoing, it can be seen that the invention provides a means for isolating and insulating a pipeline support system so that heat is not conducted away from the fluid pipeline. Thus, a ring clamp 20 for supporting and anchoring an arctic pipeline 11 comprises substantially rigid, curved clamp portions 22, 26 adapted to encircle the pipeline 11. The clamp portions 22, 26 have inner and outer layers 40, 42 of fiber reinforced rigid polymer material and an intermediate core layer 44 of honeycomb-form aramid paper.

While the invention has been described in the more limited aspects of a preferred embodiment thereof, other embodiments have been suggested and still others will occur to those skilled in the art upon the reading and understanding of the foregoing specification. It is intended that all such embodiments be included within the scope of this invention as limited only by the appended claims.

Having thus described my invention, I claim:

1. A ring clamp for supporting and anchoring a large diameter metallic arctic pipeline comprising substantially rigid, curved clamp portions adapted to completely encircle said pipeline and fastening means connecting said clamp portions, said clamp portions having inner and outer layers of fiber reinforced rigid polymer material and an intermediate core layer of honeycomb-form aramid paper.

2. The ring clamp as set forth in claim 1 further including mounting means for connecting said clamp to a ground anchor.

3. The clamp as set forth in claim 2 wherein the mounting means is constructed of a sandwich of fiber reinforced polymer and an intermediate core layer of honeycomb-form aramid paper.

4. The clamp as set forth in claim 3 wherein the curved clamp portions comprise a lower saddle portion and an upper retaining portion and said mounting means is part of said lower saddle portion.

5. The clamp as set forth in claim 1 wherein said inner layer of fiber reinforced polymer has a cylindrical inner face coated with polytetrafluoroethylene.

* * * * *